United States Patent [19]

Bane

[11] 3,776,572
[45] Dec. 4, 1973

[54] MOTORCYCLE TOWING DEVICE

[76] Inventor: James Bane, 1337 Amadore Ave., Ontario, Calif.

[22] Filed: Sept. 20, 1972

[21] Appl. No.: 290,622

[52] U.S. Cl.................. 280/292, 280/402, 254/131
[51] Int. Cl............................................. B62d 53/04
[58] Field of Search........................ 280/402, 292; 254/131

[56] References Cited
UNITED STATES PATENTS

| 3,430,983 | 3/1969 | Jones | 280/402 R |
| 3,428,332 | 2/1969 | McCance | 280/402 X |
| 2,988,382 | 6/1961 | Holland | 280/402 X |
| 1,957,126 | 5/1934 | Appel | 254/131 R |

*Primary Examiner*—Leo Friaglia
*Assistant Examiner*—Randall A. Schrecengost
*Attorney*—Charles G. Lyon et al.

[57] ABSTRACT

A towing device for motorcycles uses a channel member bent into a segment of a circle to receive the front wheel of a motorcycle. A clamp attaches a plate welded to the channel member to the rear bumper of a vehicle and levers pivotally raise the channel member and wheel off of the ground.

3 Claims, 4 Drawing Figures

PATENTED DEC 4 1973 3,776,572

MOTORCYCLE TOWING DEVICE

BACKGROUND OF THE INVENTION

This invention relates to a device for towing motorcycles. It is simple to make, easily attached to a motorcycle, and permits the towing of a motocycle without lifting the vehicle from the ground.

It is a feauure of this invention that a channel shaped member bent into a segment of a circle is provided into which the front wheel of the motorcycle is secured for the purpose of towing the motorcycle. Thereafter by a leverage system, the front wheel only is raised from the ground and locked in an elevated position. The towing is performed in this position and no further needs to be done.

These advantages and features will be apparent from the annexed specification in which FIG. 1 is a side view of an apparatus embodying the present invention as it appears as a motorcycles's front wheel is first inserted therein.

DESCRIPTION OF THE PREFERRED EMBODIMENT

Figure 1:
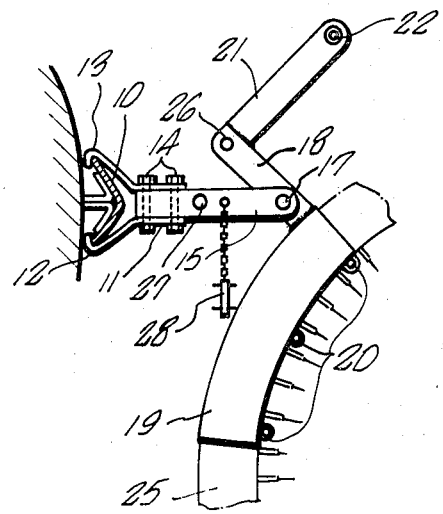

Referring now more particularly to the drawings, the numeral 10 represents the bumper of an automobile. A clamp 11 comprising two separate members 12 and 13 is affixed to the bumper by bolts 14 which also clamp a pair of spaced plates 15 and 16 which plates carry a bolt 17 which acts as a pivot for an arm 18 which in turn is welded to a channel 19. The channel 19 is bent in the form of a segment of a circle and carries a set of lugs 20 having openings therein for the receipt of pins (not shown). The arm 18 is welded to another arm 21 which carries a handle 22.

Figure 2:
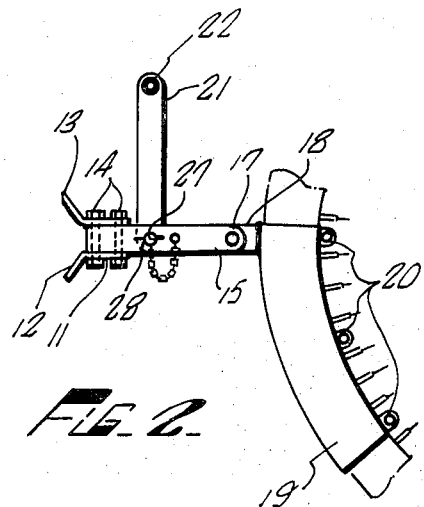
FIG. 2 is a side view similar to FIG. 1 in the raised position.
Figure 3:
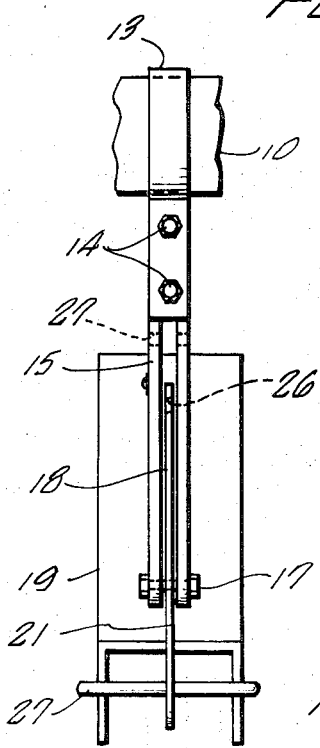
FIG. 3 is an enlarged top view of the device shown in FIG. 1.
Figure 4:
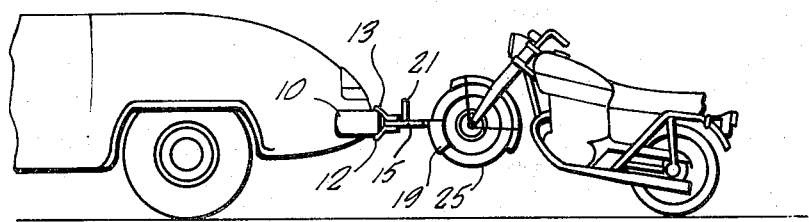
FIG. 4 is a side elevation showing the device in use towing a motorcycle.

The operation of the above described device is as follows:

Assuming the apparatus to be in the position as shown in FIG. 1, a motorcycle is driven until its front wheel 25 nests in the channel 19 where it is retained by pins inserted in the lugs 20 engaging the felly of the wheel thus securely retaining the front wheel 25 in the channel shaped member 19. With the device in this position, the operator then pushes forward on the handle 22 pivoting the whole apparatus in a counterclockwise direction about the bolt 17 until the hole 16 in arm 18 registers with the hole 27 in members 15 and 16 where the arm 18 is held in position by pin 28 being inserted in hole 27. This position is illustrated in FIG. 2. This action will result in raising the front wheel of the motorcycle off the ground as is shown in FIG. 4 in which position the apparatus is ready for towing a motorcycle.

While there has been described what is presently considered a preferred embodiment of the present invention, it will be appreciated by those skilled in the art that various changes and modifications may be made therein without departing from the essence of the invention.

What is claimed as new and desired to be secured by Letters Patent of the United States is:

1. A motorcycle towing apparatus comprising:
   a. a channel member bent into a segment of a circle and adapted to receive and hold a portion of a front wheel of a motorcycle;
   b. clamp means attached thereto for attaching to a rear bumper of a vehicle; and
   c. a lever for raising said channel member to lift said front wheel off the ground.

2. Apparatus as set forth in claim 1 in which an arm is welded to said channel member and a plate is attached to said clamp means with siad arm being pivoted adjacent to the end of said plate.

3. Apparatus as set forth in claim 2 in which said plate and said arm are provided with holes which register when said arm is pivoted into alignment with said plate and a pin is provided to lock said arm and plate together.

* * * * *